United States Patent
Duvaut et al.

(10) Patent No.: US 7,660,260 B2
(45) Date of Patent: Feb. 9, 2010

(54) DOWNSTREAM POWER BACK-OFF FOR FIBER TO NODE APPLICATIONS

(75) Inventors: Patrick Duvaut, Tinton Falls, NJ (US); Amitkumar Mahadevan, Eatontown, NJ (US); Massimo Sorbara, Freehold, NJ (US)

(73) Assignee: Ikanos Communications, Inc., Fremont, CA (US)

( * ) Notice: Subject to any disclaimer, the term of this patent is extended or adjusted under 35 U.S.C. 154(b) by 361 days.

(21) Appl. No.: 11/712,125

(22) Filed: Feb. 28, 2007

(65) Prior Publication Data

US 2007/0237214 A1 Oct. 11, 2007

Related U.S. Application Data

(60) Provisional application No. 60/789,850, filed on Apr. 6, 2006.

(51) Int. Cl.
*H04J 1/16* (2006.01)
*H04B 1/38* (2006.01)

(52) U.S. Cl. ...................... 370/252; 375/222
(58) Field of Classification Search .............. 370/252; 375/222
See application file for complete search history.

(56) References Cited

U.S. PATENT DOCUMENTS

| | | | |
|---|---|---|---|
| 6,205,220 B1 * | 3/2001 | Jacobsen et al. | 379/417 |
| 6,292,559 B1 * | 9/2001 | Gaikwad et al. | 379/417 |
| 6,839,429 B1 * | 1/2005 | Gaikwad et al. | 379/417 |
| 6,922,448 B1 * | 7/2005 | Jacobsen et al. | 375/295 |
| 7,372,899 B2 * | 5/2008 | Duvaut et al. | 375/222 |
| 2004/0114751 A1 * | 6/2004 | Tomilson | 379/399.01 |
| 2005/0152442 A1 * | 7/2005 | Duvaut et al. | 375/222 |
| 2005/0190826 A1 * | 9/2005 | Van Bruyssel et al. | 375/222 |
| 2006/0062288 A1 * | 3/2006 | Hester | 375/222 |
| 2006/0257148 A1 * | 11/2006 | Hirth et al. | 398/71 |
| 2008/0123725 A1 * | 5/2008 | J et al. | 375/224 |
| 2008/0212768 A1 * | 9/2008 | Zhou | 379/417 |

FOREIGN PATENT DOCUMENTS

| | | |
|---|---|---|
| JP | 2000-101486 | 4/2000 |
| JP | 2003-333210 | 11/2003 |
| JP | 2006-033379 | 2/2006 |
| JP | 2006-180331 | 7/2006 |

* cited by examiner

*Primary Examiner*—Andrew Lee
(74) *Attorney, Agent, or Firm*—Thomas, Kayden, Horstemeyer & Risley, LLP

(57) ABSTRACT

There is provided a method of shaping PSD (Power Spectrum Density) of an FTTN (Fiber-To-The-Node) downstream signal from a disturber source to achieve spectral compatibility at an FTTN downstream victim with a downstream PSD from a reference source. The method includes receiving the downstream PSD from the reference source. The method further includes receiving an unshaped downstream PSD from the disturber source. The method further includes shaping the PSD of the FTTN downstream signal to have a substantially equivalent FEXT (Far-End Cross-Talk) into the FTTN downstream victim as the downstream PSD from the reference source.

20 Claims, 4 Drawing Sheets

DOWNSTREAM POWER BACK-OFF FOR FIBER TO NODE APPLICATIONS

RELATED APPLICATIONS

This application is based on and claims priority from U.S. Provisional Application No. 60/789,850, filed on Apr. 6, 2006, which is hereby incorporated by reference in its entirety.

BACKGROUND OF THE INVENTION

1. Field of the Invention

The present invention relates generally to Digital Subscriber Line (DSL) systems and, more specifically to spectral shaping in DSL systems.

2. Background Art

DSL (Digital Subscriber Line) service, such as Very high bit-rate DSL (VDSL) service, can typically be provided for DSL users located in a building via a DSL system deployed from a cabinet located close to the building or via a DSL system deployed from a cabinet located in the building. In a DSL system deployed from a cabinet located close to the building, fiber is generally deployed to cabinet, which is typically referred to as Fiber-To-The-Node (FTTN) deployment. In a DSL system deployed from a cabinet located in the building, fiber is generally deployed to the cabinet in the building, which is typically referred to as Fiber-To-The-Building (FTTB) deployment. However, cables for the DSL system utilizing FTTN deployment (i.e. an FTTN DSL system) and cables for the DSL system utilizing FTTB deployment (i.e. an FTTB DSL system) typically share the same multi-pair cable in the building. As a result, interference, such as FEXT (Far-End Cross-Talk), can occur between downstream signals in the respective FTTN and FTTB DSL systems, which can cause spectral incompatibility problems between the two systems.

A downstream signal in an FTTN DSL system (i.e. an FTTN downstream signal) originates from a DSL modem (e.g. a VDSL modem) located in a cabinet located outside the building, while a downstream signal in an FTTB DSL system (i.e. an FTTB downstream signal) originates from a DSL modem (e.g. a VDSL modem) located in a cabinet inside the building. As a result, the FTTB downstream signal typically injects a higher level of interference into the FTTN downstream signal than the FTTN downstream signal injects into the FTTB downstream signal. To reduce the level of interference injected into the FTTN downstream signal by the FTTB downstream signal to ensure spectral compatibility between the FTTN and FTTB DSL systems, the FTTB DSL system can be required to employ a technique such as downstream power back-off (DPBO) to appropriately shape the spectrum of the FTTB downstream signal. However, in some situations, such as a situation that exists in Japan, the FTTB DSL system in the building may not be required to employ any downstream signal spectral shaping techniques. Accordingly, there is a need in the art for a method to ensure spectral compatibility between FTTN and FTTB DSL systems that serve DSL users in the same building.

SUMMARY OF THE INVENTION

Downstream power back off for fiber to node applications, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

Figure 1:
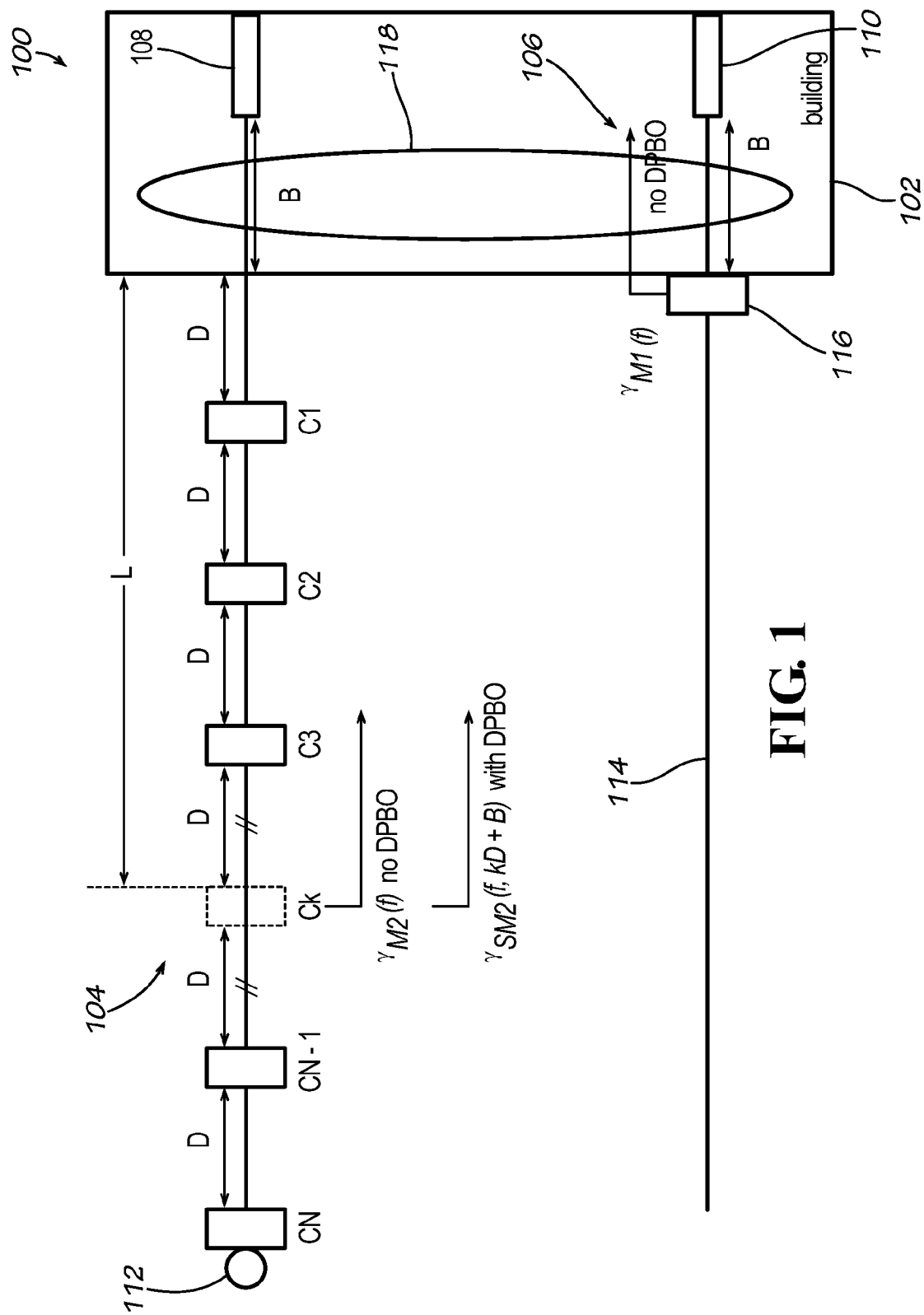
FIG. 1 illustrates a diagram of system including an exemplary FTTN (Fiber-To-The-Node) DSL (Digital Subscriber Line) system and an exemplary FTTB (Fiber-To-The-Building) DSL system, according to one embodiment of the present application.

Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely example embodiments of the invention. To maintain brevity, other embodiments of the invention which use the principles of the present invention are not specifically described in the present application and are not specifically illustrated by the present drawings. It should be borne in mind that, unless noted otherwise, like or corresponding elements among the figures may be indicated by like or corresponding reference numerals.

FIG. 1 illustrates DSL service system 100 for providing DSL service to DSL users in building 102, according to one embodiment of the present application. As shown in FIG. 1, DSL service system 100 includes FTTN (Fiber-To-The-Node) DSL system 104 and FTTB (Fiber-To-The-Building) DSL system 106, which provide DSL service, such as VDSL (Very high bit-rate Digital Subscribe Line) service, to respective DSL users, such as DSL users 108 and 1110, situated in building 102. Further shown in FIG. 1, FTTN cabinets C1, C2, ..., Ck, ..., CN–1, CN (hereinafter FTTN cabinets "C1 through CN") are each situated at a known distance from building 102. In the present application, an FTTN cabinet is also referred to as a "disturber source." For example, FTTN cabinet Ck is situated at distance L from building 102. For example, each of FTTN cabinets C1 through CN can be situated at an integer multiple of distance D from building 102. For example, distance D can be substantially equal to 50 meters. If, for example, each of FTTN cabinets C1 through CN is situated at an integer multiple of distance D from building 102, distance L can be substantially equal to kD. In one embodiment, FTTN cabinets C1 through CN are unevenly spaced such that distance L, the distance between FTTN cabinet Ck and building 102, is not equal to kD.

Also shown in FIG. 1, fiber can be provided to feeder point 112, which is located at FTTN cabinet CN. Each of FTTN cabinets C1 through CN, such as FTTN cabinet Ck, can provide a node or feeder point for deploying a DSL modem, such as a VDSL modem, in an FTTN DSL system, such as FTTN DSL system 104, to provide DSL service to one or more DSL users, such as DSL user 108, in building 102. Further shown in FIG. 1, distance B is the distance from a point at which cable for an FTTN DSL system, such as FTTN DSL system 104, enters the building to a DSL end user, such as DSL user 108, in the FTTN DSL system. In the present application, a DSL end user in the FTTN DSL system is also referred to as an "FTTN downstream victim." For example, distance B can be approximately equal to 50 meters.

Also shown in FIG. 1, fiber 114 is deployed to FTTB (Fiber-To-The-Building) cabinet 116, which can be situated at building 102. In the present application, an FTTB cabinet is also referred to as a "reference source." For example, FTTB cabinet 116 can be situated in the basement of building 102. FTTB cabinet 116 can provide a node or feeder point for deploying a DSL modem, such as a VDSL modem, in an FTTB DSL system, such as FTTB DSL system 106, to provide DSL service to one or more users, such as user 110, in building 102. Further shown in FIG. 1, distance B is also the distance from the feeder point at FTTB cabinet 116 to a DSL end user, such as DSL user 110, in FTTB DSL system 106.

In DSL service system 100, cables, such as twisted pair cables, from one or more of FTTN cabinets C1 through CN in FTTN DSL systems are typically routed in building 102 in a large multi-pair cable (indicated by dashed ellipse 118) that also includes cables, such as twisted pair cables, from FTTB cabinet 116 in FTTB DSL system 106. For example, a twisted pair cable from FTTN cabinet Ck used by a VDSL modem in FTTN DSL system 104 to serve DSL user 108 can be routed in a multi-pair cable that also includes a twisted pair cable from FTTB cabinet 116 used by a VDSL modem in FTTB DSL system 106 to serve DSL user 110. In DSL service system 100, DSL users, such as DSL user 108, in FTTN DSL system 104 and DSL users, such as DSL user 110, in FTTB DSL system 106 can be in relatively close proximity to each other in building 102.

Since cables from FTTN and FTTB DSL systems can share a multi-pair cable in building 102, interference can occur between a downstream signal, such as a downstream VDSL signal, from a DSL modem in an FTTN cabinet in the FTTN DSL system and a downstream DSL signal, such as a downstream VDSL signal, from a DSL modem in an FTTB cabinet in the FTTB DSL system. For example, FEXT (Far-End Cross-Talk) is a type of interference that can be injected from a downstream signal in an FTTN DSL system (i.e. an FTTN downstream signal) into a downstream signal in an FTTB DSL system (i.e. an FTTB downstream signal), and vice versa. However, an FTTN downstream DSL signal, which originates from an FTTN cabinet outside the building, typically has reduced power in the building as a result of significant attenuation that can occur in the signal prior to entering the building. As a result, an FTTB downstream signal, which originates from an FTTB cabinet inside the building, can inject a greater amount of FEXT into the FTTN downstream signal compared to the amount of FEXT that the FTTN downstream signal can inject into the FTTB downstream signal.

The difference in power between the FTTN and FTTB downstream signals in the building can be adjusted by requiring the service provider that provides DSL service for the FTTB DSL system to transmit at a lower power by appropriately shaping the spectrum of the FTTB downstream signal so as to be compliant with FTTN downstream DSL signals that originate outside the building. However, the above approach does not work in a situation where the service provider that provides the FTTB downstream signals is not required to provide any spectrum shaping, such as a situation that can exist in Japan. The present invention provides a DPBO (downstream power back-off) method for shaping the Power Spectrum Density (PSD) of an FTTN downstream signal, such as an FTTN downstream VDSL signal, to provide spectral compatibility with an FTTB downstream signal, such as an FTTB downstream VDSL signal, in a building in which the shaping of the spectrum of the FTTB downstream signal is not required.

In an embodiment of the present invention's method of shaping a PSD of an FTTN downstream signal in an FTTN DSL system, the following assumptions can be applied:

The downstream PSD in the building (e.g. in FTTB cabinet 116 in building 102 in FIG. 1) is based on Table C-1 in ITU-T Recommendation G.993.2, "Very high speed digital subscriber line transceivers 2 (VDSL2)," February, 2006, hereby incorporated by reference (equivalent to mask M1 for FTTCab in Table 5 from T1.424-2004, "Interface between Networks and Customer Installation; Very-high-bit-rate Digital Subscriber Lines (VDSL); Metallic Interface (DMT Based)," ATS Standard, Jun. 1, 2006, hereby incorporated by reference, extended to fit the 30 MHz band plan). The maximum transmit power for downstream PSD is 11 dBm. No power back-off is applied in the building.

The downstream PSD in the cabinet (e.g. FTTN cabinets C1 through CN in FIG. 1) is based on mask M2 FTTCab in Table 5 from T1.424-2004, and it is extended to fit the 30 MHz band plan. This is a slightly boosted mask that is required in the cabinet if there is no power back-off rule applied in the building deployments. The maximum transmit power of the M2 PSD is limited to 14.5 dBm per the requirements of profile 30a in ITU-T Recommendation G.993.2.

The distance of the cabinet (e.g. FTTN cabinets C1 through CN in FIG. 1) is an integer multiple of D, which is substantially equal to 50 meters. Distance B in FIG. 1 is also substantially equal to 50 meters.

In the present invention, the PSD (Power Spectrum Density) of the FTTN downstream signal from an FTTN cabinet (i.e. a disturber source), such as cabinets C1 through CN in FIG. 1, in an FTTN DSL system can be shaped to have substantially the same FEXT (Far-End Cross-Talk) into a DSL user (i.e. FTTN downstream victim), such as DSL user 108, in a building as the FTTB downstream signal originating from an FTTB cabinet in the building (i.e. a reference source). The downstream PSD originating from the building can be defined as $\gamma_{M1}(f)$; the unshaped downstream PSD originating from the FTTN cabinet (e.g. originating from FTTN cabinets C1 through CN) can be defined as $\gamma_{M2}(f)$; and the shaped downstream PSD originating from the FTTN cabinet can be defined as $\gamma_{SM2}(f)$.

The FEXT PSD ($\gamma_{M1}^{FEXT}$) caused by a reference source transmitting PSD $\gamma_{M1}(f)$ from a location in the building (e.g. FTTB cabinet 116 in building 102) located at distance B from a DSL user (i.e. an FTTN downstream victim) in the building can be represented by the equation:

$$\gamma_{M1}^{FEXT}(f,B) = \alpha_{10}^{-0.1 X_{B,dB}} \cdot f^2 \cdot \gamma_{M1}(f) \cdot B \cdot |H(f,B)|^2 \qquad \text{equation (1)}$$

where f is the frequency of the FEXT in Hz, $\alpha$ is a constant that has been empirically determined, $X_{B,dB}$ is a worst-case coupling in dB between a twisted-pair cable of a DSL user in an FTTB DSL system and a twisted-pair cable of a DSL user (i.e. an FTTN downstream victim) in an FTTN DSL system, and H(f,B) is the transfer function of a cable (e.g. a twisted copper pair) at frequency f and length equal to B (in meters). The FEXT PSD ($\gamma_{M2}^{FEXT}$) caused by a DSL modem (e.g. a VDSL modem) transmitting PSD ($\gamma_{M2}$) from a cabinet (e.g. cabinet Ck) (i.e. a disturber source) located at distance L+B from the DSL user (i.e. the FTTN downstream victim) in the building can be represented by the equation:

$$\gamma_{M2}^{FEXT}(f,L+B) = \alpha_{10}^{-0.1Xk_{dB}} \cdot f^2 \gamma_{M2}(f) \cdot (L+B) \cdot |H(f,L+B)|^2 \quad \text{equation (2)}$$

where f is the frequency of the FEXT noise in Hz and H(f,L+B) is the transfer function of a cable (e.g. a twisted copper pair) at frequency f and length equal to L+B (in meters). For example, L can be equal to kD, where the cable originates from FTTN cabinet Ck in FIG. 1 and where each FTTN cabinet is spaced-apart an equal distance D. The relationship between $\gamma_{M1}(f)$ (i.e. the downstream PSD originating from a reference source, such as an FTTB cabinet in a building) and $\gamma_{M2}(f)$ (i.e. the unshaped downstream PSD originating from a disturber source, such as an FTTN cabinet (e.g. FTTN cabinet Ck) located outside the building) can be represented by the equation:

$$\gamma_{M1}(f) \leq \gamma_{M2}(f) \quad \text{equation (3)}.$$

In the present invention, $\gamma_{SM2}(f)$ (i.e. the shaped downstream PSD at the disturber source, such as an FTTN cabinet in the FTTN DSL system) is determined such that the FEXT (Far End Cross-Talk) of $\gamma_{SM2}(f)$ is substantially equivalent to $\gamma_{M1}^{FEXT}$ (i.e. the FEXT of $\gamma_{M1}(f)$ at distance B from a DSL end user (i.e. the FTTN downstream victim) in the building). For example, $\gamma_{SM2}(f)$ can be determined by replacing $\gamma_{M2}(f)$ by $\gamma_{SM2}(f)$ in equation (2), utilizing the relationship between $\gamma_{M1}(f)$ and $\gamma_{M2}(f)$ in equation (3), setting $\gamma_{M1}^{FEXT}(f,B) = \gamma_{M2}^{FEXT}(f,L+B)$, and solving the above equation for $\gamma_{SM2}(f)$. As a result, $\gamma_{SM2}(f)$ can be shaped by using the equation:

$$\gamma_{SM2}(f) = \text{MIN}\left\{\gamma_{M2}(f), \gamma_{M1}(f) \cdot \frac{1}{1 + \frac{L}{B}} \cdot \frac{1}{|H(f,L)|^2}\right\} \quad \text{equation (4)}$$

where $\gamma_{M1}(f)$ is the downstream PSD of a signal originating from an FTTB cabinet located in the building (i.e. a reference source), $\gamma_{M2}(f)$ is the unshaped downstream PSD of a signal originating from an FTTN cabinet located outside of the building (i.e. a disturber source), L is the distance from the FTTN cabinet to the entrance point of entrance of the FTTN DSL system into the building, B is the distance from the entrance point of the FTTN DSL system into the building to a DSL end user in the building (i.e. an FTTN downstream victim), f is the frequency of the shaped FTTN downstream signal, and H(f, L) is a transfer function of a cable (e.g. a twisted copper pair) at frequency f and having length L. H(f, L) corresponds to the amount of attenuation suffered by a transmitted signal at frequency f as it travels through the cable (e.g. a twisted copper pair) having a length equal to L.

The DPBO (downstream power back-off) shaping rule expressed in equation (4) can also be expressed in a format as defined in specification G.997.1, "Draft revised Recommendation G.997.1 (rev3) (for consent)," TD210Rev1 (PLEN/15, Feb. 17, 2006, Geneva, Switzerland, hereby incorporated by reference. In accordance with the format as defined in specification G.997.1, the FTTN DPBO PSD to be deployed at an FTTN cabinet can be defined:

RESULTMASKds(f)=min(PSDMASKds(f), PBPSD(f)), where:

RESULTMASKds(f)=$\gamma_{SM2}(f)$, the shaped downstream PSD of a signal transmitted from the FTTN cabinet.

PSDMASKds(f)=$\gamma_{M2}(f)$, the unshaped downstream PSD of a signal transmitted from the FTTN cabinet (i.e. the M2 FTTCab mask).

PBPSD(f) is the "Predicted Shaping of the Building PSD" defined as PBPSD(f)=BPSD(f)−(DPBONSCMA+DPBONSCMB·$\sqrt{f}$+DPBONSCMC·f)·DPBONBSEL DPBONBSEL is the electrical length of the cable between the FTTN cabinet and the building defined as DPBONBSEL=length (m)×0.0259 (dB/[mV$\sqrt{\text{MHz}}$]) with length (m) equal to the distance in meters between the FTTN cabinet and building (for Japanese cable).

DPBONSEL is the electrical length of the cable between the FTTB cabinet and the VTU-R (end user) in the building defined as DPBONSEL=length (m)×0.0259 (dB/[mV$\sqrt{\text{MHz}}$]) with length (m) equal to the distance in meters between the FTTB cabinet and the VTU-R (for Japanese cable).

Frequency f is in MHz.

The values for DPBONSCMA, DPBONSCMB, and DPBONSCMC are defined in Table 1 below.

TABLE 1

Cable Model Parameters.

| | DPBONSCMA [$\sqrt{\text{MHz}}$] | DPBONSCMB [No-dimension] | DPBONSCMC [$1/\sqrt{\text{MHz}}$] |
|---|---|---|---|
| FTTN | $-\dfrac{10\log_{10}\left(1 - \dfrac{\text{DPBONBSEL}}{\text{DPBONSEL}}\right)}{\text{DPBONBSEL}}$ | −1 | 0 |

Thus, as discussed above, the present invention provides a downstream power back-off (DPBO) shaping method for FTTN DSL systems, where DSL end users in a building are served by central office DSL modems (e.g. VDSL modems) located either in an FTTB cabinet (i.e. a cabinet located within the building) or within an FTTN cabinet (i.e. a cabinet located outside of the building in an FTTN DSL system). In the invention's DPBO shaping method, it is assumed that the DSL modems (e.g. VDSL modems) deployed in the FTTB cabinet do not use any DPBO method to provide spectral compatibility with DSL signals (e.g. VDSL signals) that originate from an FTTN cabinet and enter the building sharing the same cable. Since the DSL modems in the FTTB DSL system do not use a DPBO technique, they can introduce a large amount of FEXT (Far-End Cross-Talk) into FTTN downstream signals entering the building, resulting in spectral incompatibility.

In order to achieve spectral compatibility for FTTN downstream signals entering the building, a DSL modem in the FTTN cabinet can be configured to transmit downstream signals with a slightly higher transmit power than FTTB downstream signals from a DSL modem in the FTTB cabinet and the DSL modem in the FTTN cabinet can also be configured to shape the PSD (Power Spectrum Density) of the FTTN downstream signal such that the FEXT introduced into an FTTN downstream victim is substantial equivalent to the FEXT introduced into the FTTN downstream victim by a DSL modem in the FTTB cabinet by using equation (4).

Figure 2:
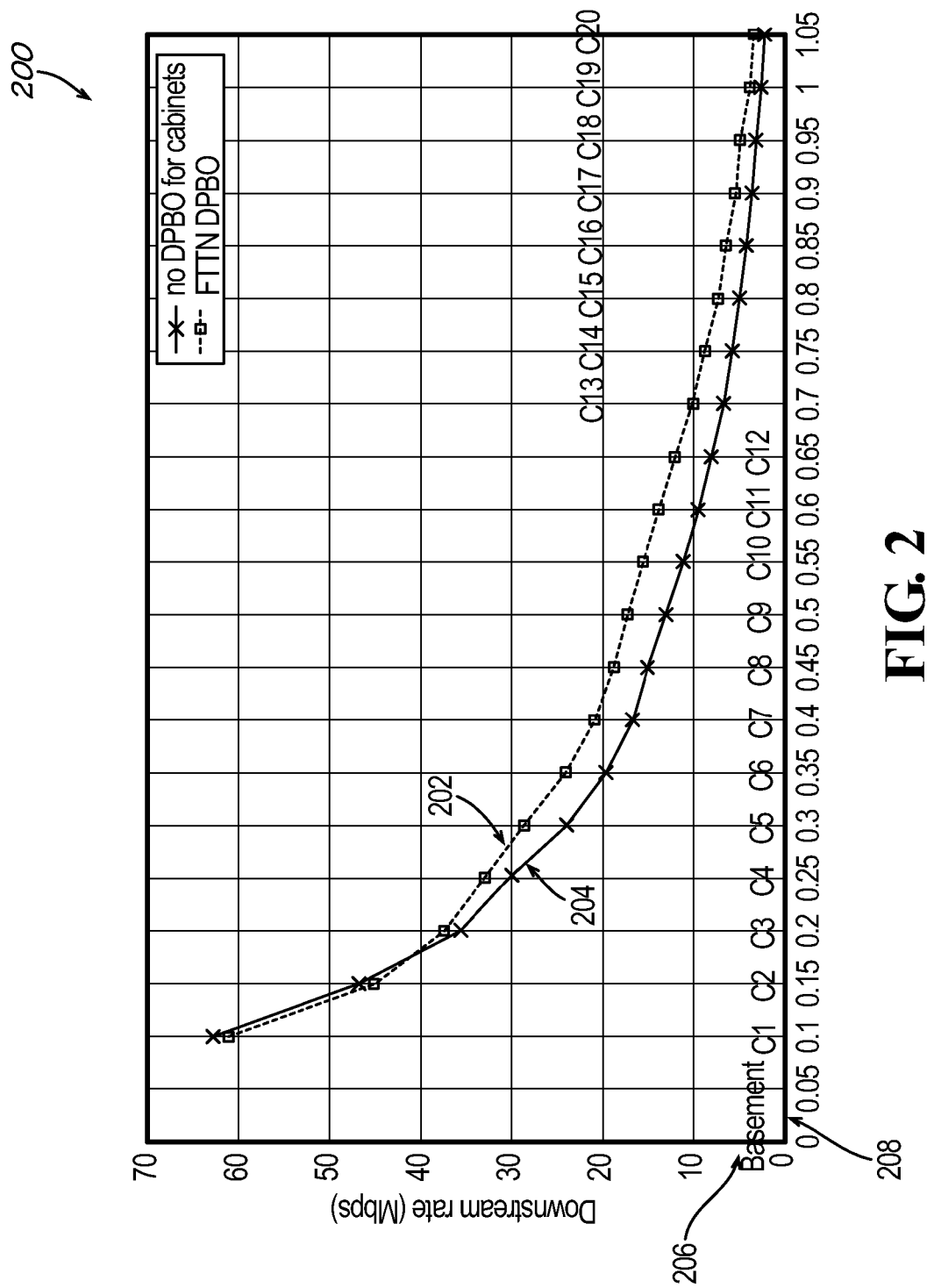
FIG. 2 illustrates a graph showing a bit-rate curve of an FTTN downstream signal having a PSD (Power Spectrum Density) shaped according to one embodiment of the present invention.

FIG. 2 shows graph 200 including shaped PSD bit-rate curve 202 and unshaped PSD bit-rate curve 204 in accordance with one embodiment of the present invention. In graph 200, downstream bit-rate axis 206 shows an exemplary range of downstream bit-rates in megabits per second (Mbps) and distance axis 208 shows distance in kilometers (km) between FTTN cabinets situated outside of a building and an end user situated in the building. In graph 200, shaped PSD bit-rate curve 202 shows simulated bit-rates that can be achieved by a DSL modem (e.g. a VDSL modem) situated at each of twenty FTTN cabinets (e.g. each of FTTN cabinets C1 through C20 in FIG. 1), where the DSL modem is configured to shape a PSD of an FTTN downstream signal originating at each of the FTTN cabinets according to an embodiment of the invention's FTTN DPBO (downstream power back-off) shaping method discussed above.

In graph 200, unshaped PSD bit-rate curve 204 shows simulated bit-rates that can be achieved by a DSL modem (e.g. a VDSL modem) without using the invention's FTTN DPBO shaping method. As shown in graph 200, when the FTTN cabinet is within 50 meters of the building (i.e. at point C1 in graph 200), the capacity of the DSL modem at the FTTN cabinet is higher without the invention's FTTN DPBO shaping than with FTTN DPBO shaping. However, at FTTN cabinet locations greater than 100 meters (i.e. greater than point C2 in graph 200), a DSL modem configured to use the invention's FTTN DPBO shaping method provides a higher bit-rate capacity than compared to a DSL modem configured without using the invention's FTTN DPBO shaping method. It is noted that for the simulation shown in graph 200, the following parameters per jj-100.1, "Spectrum Management for Metallic Transmission Systems," Mar. 17, 2005, hereby incorporated by reference in its entirety, are assumed: 0.4 millimeter PE cable and 1 intra-FEXT disturber from FTTN cabinet C1 and 4 inter-FEXT disturbers from an FTTB cabinet inside the building.

Figure 3:
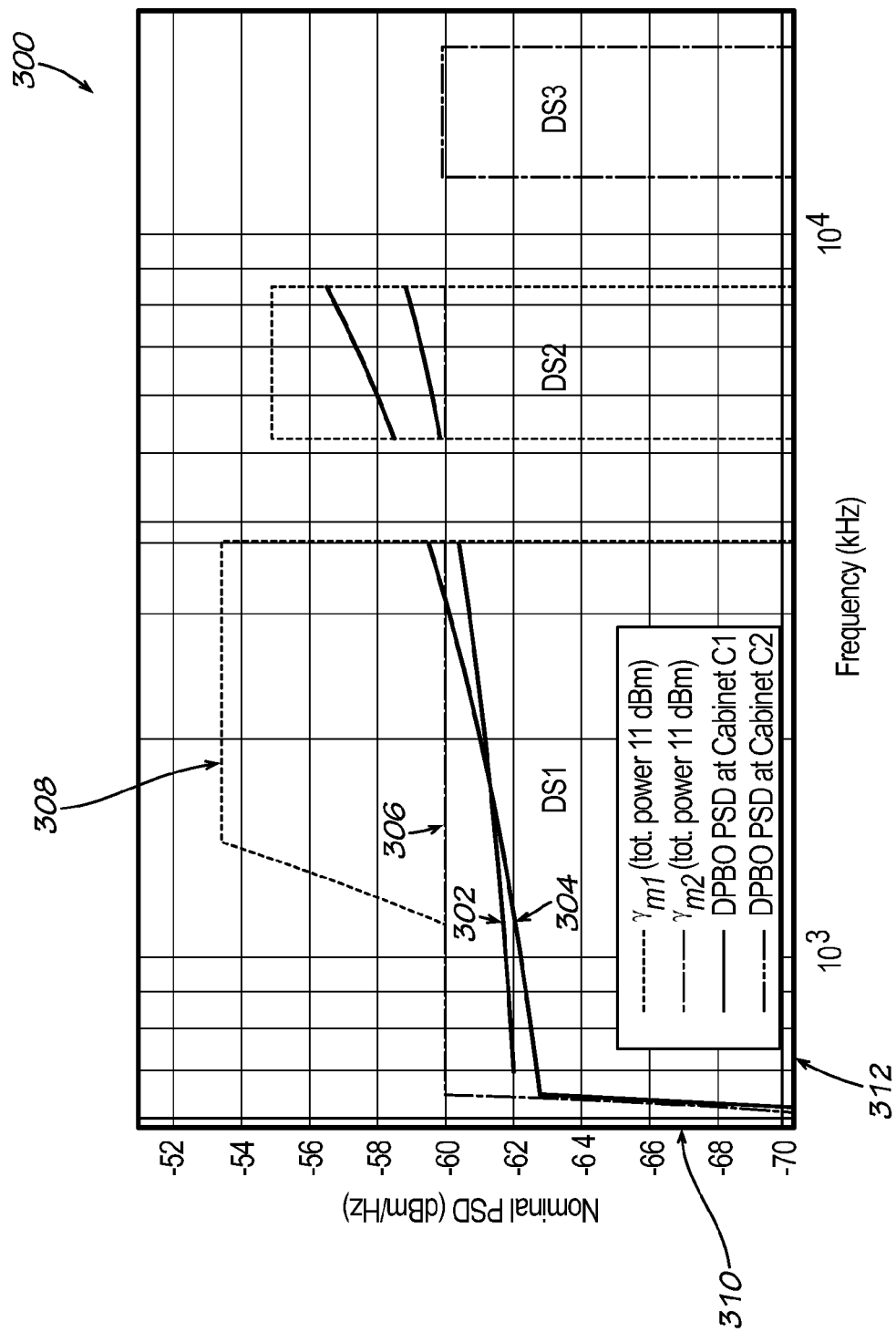
FIG. 3 illustrates a graph showing shaped PSD curves of FTTN downstream signals according to one embodiment of the present invention.

FIG. 3 shows graph 300 including shaped PSD curves 302 and 304 and unshaped PSD curves 306 and 308 in accordance with one embodiment of the present invention. In graph 300, PSD axis 310 shows an exemplary range of nominal PSDs (dBm/Hz) and frequency axis 312 shows an exemplary range of frequencies. As shown in graph 300, shaped PSD curves 302 and 304 show FTTN downstream signals originating at respective FTTN cabinets C1 and C2 (shown in FIG. 1) and having PSDs shaped by the invention's FTTN DPBO shaping method discussed above. As also shown in graph 300, unshaped PSD curve 306 shows $\gamma_{M1}(f)$, which is the downstream PSD of a signal originating from an FTTB cabinet in the building, and unshaped PSD curve 308 shows $\gamma_{M2}(f)$, which is the unshaped downstream PSD of a signal originating from an FTTN cabinet. As shown in graph 300, shaped PSD curves 302 and 304 increase with increasing frequency.

It is noted that for the simulation shown in graph 300, $\gamma_{M1}(f)$ is based on Table C-1 in ITU-T Recommendation G.993.2 (equivalent to mask M1 for FTTCab in Table 5 from T1.424-2004, extended to fit the 30 MHz band plan). The maximum transmit power for $\gamma_{M1}(f)$ is 11 dBm. $\gamma_{M2}(f)$ is based on mask M2 FTTCab in Table 5 from T1.424-2004, and it is extended to fit the 30 MHz band plan. The maximum transmit power of $\gamma_{M2}(f)$ is 14.5 dBm. Also, shaped PSD curves 302 and 304 show FTTN downstream signals originating at respective FTTN cabinets C1 and C2, where distances D and B (shown in FIG. 1) are each substantially equal to 50 meters.

Figure 4:
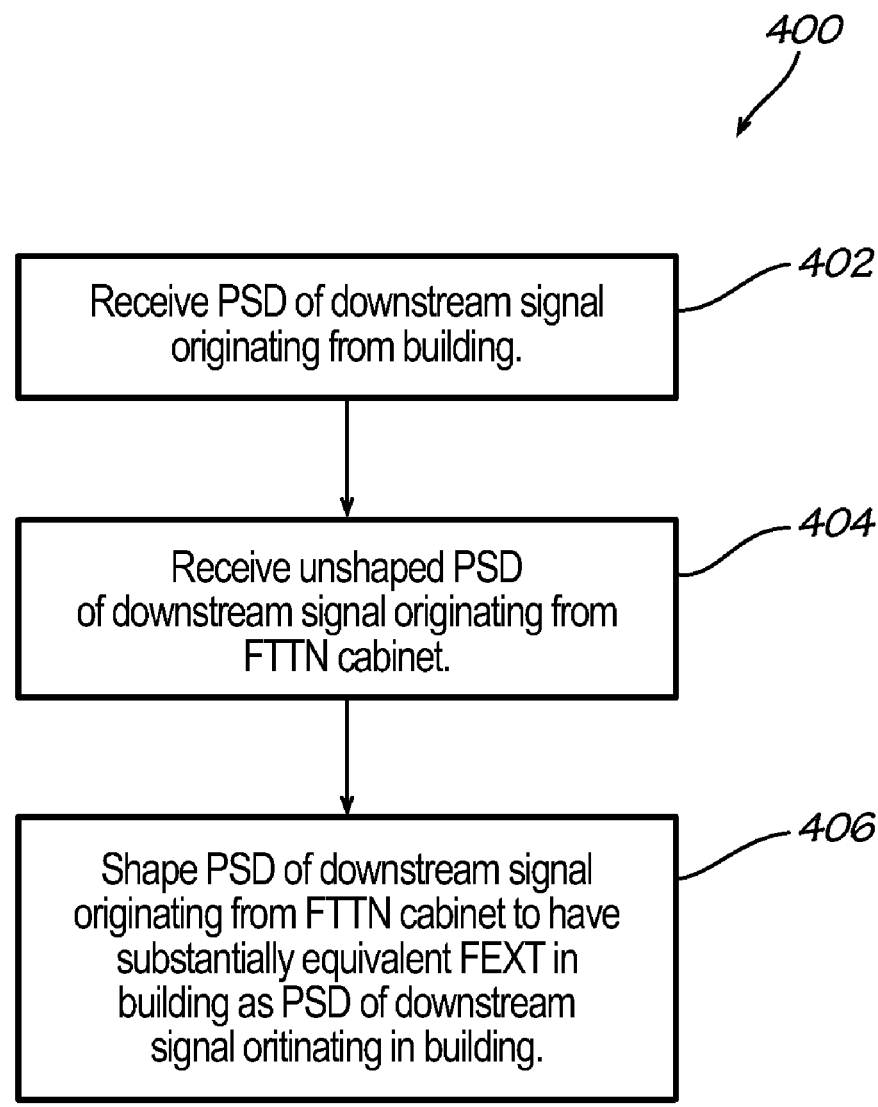
FIG. 4 illustrates a flow diagram depicting a method for shaping a PSD of an FTTN downstream signal in an FTTN DSL system according to one embodiment of the present invention.

FIG. 4 shows flowchart 400 depicting a method for shaping a PSD of an FTTN downstream signal in an FTTN DSL system in accordance with one embodiment of the present invention. Certain details and features have been left out of flowchart 400 of FIG. 4 that are apparent to a person of ordinary skill in the art. For example, a step may consist of one or more sub-steps or may involve specialized equipment, as known in the art. While steps 402 through 406 shown in flowchart 400 are sufficient to describe one embodiment of the present invention, other embodiments of the invention may utilize steps different from those shown in flowchart 400.

Beginning at step 402, a PSD of a downstream signal originating from a reference source (e.g. FTTB cabinet 116 in building 102 in FIG. 1) is received. For example, a DSL modem (e.g. a VDSL modem) can be configured to receive $\gamma_{M1}(f)$, which is a PSD of a downstream signal transmitted by a DSL modem (e.g. a VDSL modem) in FTTB cabinet 116. At step 404, an unshaped PSD of a downstream signal originating from a disturber source (i.e. an FTTN cabinet) can be received. For example, a DSL modem, such as the DSL modem in the example in step 402 of flowchart 400, can be configured to receive $\gamma_{M2}(f)$, which is an unshaped PSD of a downstream signal originating from a disturber source (e.g. FTTN cabinet Ck in FIG. 1) located outside the building.

At step 406, the PSD of the downstream signal originating from the reference source is shaped to have a substantially equivalent FEXT (Far-End Cross-Talk) into an FTTN downstream victim in the building as the PSD of the downstream signal originating from a reference source in the building. For example, a DSL modem, such as the DSL modem in the example in step 404 of flowchart 400, can be configured to shape the PSD of the downstream signal transmitted from FTTN cabinet Ck in FIG. 1 to have a substantially equivalent FEXT into an FTTN downstream victim, such as DSL user 108, as the PSD of a downstream signal originating from a reference source in the building. For example, $\gamma_{SM2}(f)$, the shaped PSD of the downstream signal transmitted at FTTN cabinet Ck, can be determining by using equation (4) discussed above.

From the above description of the invention it is manifest that various techniques can be used for implementing the concepts of the present invention without departing from its scope. Moreover, while the invention has been described with specific reference to certain embodiments, a person of ordinary skill in the art would recognize that changes could be made in form and detail without departing from the spirit and the scope of the invention. For example, it is contemplated that the circuitry disclosed herein can be implemented in software and/or hardware, and the software may be stored in any storage medium or memory. The described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method of shaping PSD (Power Spectrum Density) of an FTTN (Fiber-To-The-Node) downstream signal from a disturber source so as to achieve spectral compatibility at an FTTN downstream victim with a downstream PSD from a reference source, said method comprising:
   receiving said downstream PSD from said reference source;
   receiving an unshaped downstream PSD from said disturber source;
   shaping said PSD of said FTTN downstream signal to have a substantially equivalent FEXT (Far-End Cross-Talk) into said FTTN downstream victim as said downstream PSD from said reference source;
   wherein said reference source is in an FTTB (Fiber-To-The-Building) system and said disturber source is in an FTTN system.

2. The method of claim 1, wherein shaping uses:

$$\gamma_{SM2}(f) = \text{MIN}\left\{\gamma_{M2}(f), \gamma_{M1}(f) \cdot \frac{1}{1+\frac{L}{B}} \cdot \frac{1}{|H(f,L)|^2}\right\},$$

wherein $\gamma_{SM2}(f)$ is a shaped PSD of FTTN downstream signal, $\gamma_{M1}(f)$ is said downstream PSD from said reference source, $\gamma_{M2}(f)$ is said unshaped downstream PSD from said disturber source, L is a distance from said disturber source to said reference source, B is a distance from said FTTN downstream victim to said reference source, f is a frequency of said FTTN downstream signal, and H(f, L) is a transfer function of a cable at a frequency equal to said f and having a length equal to said L.

3. The method of claim 1, wherein said disturber source is an FTTN cabinet.

4. The method of claim 1, wherein said reference source is a building.

5. The method of claim 1, wherein said FTTN downstream signal is transmitted from said disturber source by a DSL modem.

6. The method of claim 5, wherein said DSL modem is a VDSL modem.

7. The method of claim 1, wherein said reference source is an FTTB cabinet in a building.

8. The method of claim 1, wherein said downstream PSD is transmitted from said reference source by a VDSL modem.

9. A method of shaping PSD of an FTTN downstream signal from an FTTN cabinet to achieve spectral compatibility at an FTTN downstream victim with a downstream PSD from an FTTB cabinet in a building, said method comprising:
   receiving said downstream PSD from said FTTB cabinet in said building;
   receiving an unshaped downstream PSD from said FTTN cabinet;
   shaping said PSD of said FTTN downstream signal using:

$$\gamma_{SM2}(f) = \text{MIN}\left\{\gamma_{M2}(f), \gamma_{M1}(f) \cdot \frac{1}{1+\frac{L}{B}} \cdot \frac{1}{|H(f,L)|^2}\right\},$$

wherein $\gamma_{SM2}(f)$ is a shaped PSD of said FTTN downstream signal, $\gamma_{M1}(f)$ is said downstream PSD from said FTTB cabinet in said building, $\gamma_{M2}(f)$ is said unshaped downstream PSD from said FTTN cabinet, L is a distance from said FTTB cabinet to said building, B is a distance from said FTTN downstream victim in said building to said FTTB cabinet, f is a frequency of said FTTN downstream signal, and H(f, L) is a transfer function of a cable at a frequency equal to said f and having a length equal to said L.

10. The method of claim 9, wherein said shaped PSD of said FTTN downstream signal has a substantially equivalent FEXT (Far-End Cross-Talk) into said FTTN downstream victim in said building as said downstream PSD from said FTTB cabinet in said building.

11. The method of claim 9, wherein said FTTN downstream signal from said FTTN cabinet is transmitted by a DSL modem at said FTTN cabinet.

12. The method of claim 11, wherein said DSL modem is a VDSL modem.

13. The method of claim 9, wherein said downstream PSD from said FTTB cabinet, is received from a VDSL modem.

14. A device for generating a shaped PSD of an FTTN downstream signal from a disturber source to achieve spectral compatibility at an FTTN downstream victim with a downstream PSD from a reference source, said device comprising:
   wherein said device is configurable to receive said downstream PSD from said reference source;
   wherein said device is further configurable to receive an unshaped downstream PSD from said disturber source;
   wherein said device is further configurable to generate said shaped PSD of said FTTN downstream signal to have a substantially equivalent FEXT into said FTTN downstream victim as said downstream PSD from said reference source;
   wherein said reference source is in an FTTB (Fiber-To-The-Building) system and said disturber source is in an FTTN system.

15. The device of claim 14, wherein said device generates said shaped PSD of said FTTN downstream signal using:

$$\gamma_{SM2}(f) = \text{MIN}\left\{\gamma_{M2}(f), \gamma_{M1}(f) \cdot \frac{1}{1+\frac{L}{B}} \cdot \frac{1}{|H(f,L)|^2}\right\},$$

wherein $\gamma_{SM2}(f)$ is said shaped PSD of said FTTN downstream signal, $\gamma_{M1}(f)$ is said downstream PSD from said reference source, $\gamma_{M2}(f)$ is said unshaped downstream PSD from said disturber source, L is a distance from said disturber source to said reference source, B is a distance from said FTTN downstream victim to said reference source, f is a frequency of said FTTN downstream signal, and H(f, L) is a transfer function of a cable at a frequency equal to said f and having a length equal to said L.

16. The device of claim 14, wherein said device is a DSL modem.

17. The device of claim 16, wherein said DSL modem is a VDSL modem.

18. The device of claim 14, wherein said disturber source is an FTTN cabinet.

19. The device of claim 14, wherein said reference source is an FTTB cabinet in a building.

20. The device of claim 14, wherein said downstream PSD is transmitted from said reference source by a DSL modem.

* * * * *